United States Patent
Watanabe et al.

(10) Patent No.: US 9,689,280 B2
(45) Date of Patent: Jun. 27, 2017

(54) CONTROL VALVE CONTROL METHOD AND CONTROL DEVICE, AND POWER GENERATING PLANT UTILIZING SAME

(71) Applicant: Kabushiki Kaisha Toshiba, Minato-ku (JP)

(72) Inventors: Hironori Watanabe, Yokohama (JP); Masayuki Tobo, Kawasaki (JP); Takuji Yamasaki, Kawasaki (JP); Firman Bagja Juangsa, Bandung (ID)

(73) Assignee: Kabushiki Kaisha Toshiba, Minato-ku (JP)

( * ) Notice: Subject to any disclaimer, the term of this patent is extended or adjusted under 35 U.S.C. 154(b) by 269 days.

(21) Appl. No.: 14/333,619

(22) Filed: Jul. 17, 2014

(65) Prior Publication Data

US 2015/0020499 A1     Jan. 22, 2015

(30) Foreign Application Priority Data

Jul. 17, 2013   (JP) ................................. 2013-148923

(51) Int. Cl.
   *F01K 23/10*    (2006.01)
   *F01K 9/04*     (2006.01)

(52) U.S. Cl.
   CPC .............. *F01K 23/101* (2013.01); *F01K 9/04* (2013.01); *F01K 23/10* (2013.01); *F01K 23/108* (2013.01); *Y02E 20/16* (2013.01)

(58) Field of Classification Search
   CPC ...... F01K 23/10; F01K 23/101; F01K 23/108; F01K 9/04; F01K 3/22
   See application file for complete search history.

(56) References Cited

U.S. PATENT DOCUMENTS 3,953,966 A * 5/1976 Martz ..................... F01K 13/02
                                                 60/39.182
4,081,956 A * 4/1978 Baker ........................ F01K 9/04
                                                 290/40 R
(Continued)

FOREIGN PATENT DOCUMENTS

CN       102265012 A    11/2011
JP        3804693 B2     8/2006
(Continued)

OTHER PUBLICATIONS

Combined Taiwanese Office Action and Search Report issued May 6, 2016 in Patent Application No. 10312806 (with English translation of categories of cited documents).

*Primary Examiner* — Steven Sutherland
(74) *Attorney, Agent, or Firm* — Oblon, McClelland, Maier & Neustadt, L.L.P.

(57) ABSTRACT

A gas turbine plant including a gas turbine and a compressor is provided with a steam turbine plant including a steam turbine and a condenser, and, an exhaust heat recovery boiler. Steam from the exhaust heat recovery boiler is directly flown to the condenser of the steam turbine plant through a bypass control valve. A pressure sensor detects pressure in a turbine bypass system. A controller outputs, based on a set value from an input device and a process value from the pressure sensor, an open level instruction value to the control value so as to make the process value consistent with the set value in a predetermined sampling cycle. A corrector corrects the set value from the input device in a direction in which the open level instruction value decreases when the open level instruction value from the controller becomes a value that substantially fully opens the control valve.

8 Claims, 4 Drawing Sheets

(56) References Cited

U.S. PATENT DOCUMENTS

| | | | | |
|---|---|---|---|---|
| 4,572,110 A | * | 2/1986 | Haeflich | F01K 23/108 |
| | | | | 122/1 R |
| 4,793,132 A | * | 12/1988 | Okabe | F01D 19/00 |
| | | | | 122/7 R |
| 5,203,160 A | * | 4/1993 | Ozono | F01D 19/00 |
| | | | | 60/39.182 |
| 5,357,746 A | | 10/1994 | Myers et al. | |
| 2011/0270451 A1 | | 11/2011 | Sakaguchi et al. | |

FOREIGN PATENT DOCUMENTS

| | | |
|---|---|---|
| JP | 2011-138326 | 7/2011 |
| JP | 2013-76388 | 4/2013 |
| KR | 2000-0056608 A | 9/2000 |
| KR | 10-2011-0084441 A | 7/2011 |
| TW | 266250 | 12/1995 |
| TW | 372258 | 10/1999 |

\* cited by examiner

CONTROL VALVE CONTROL METHOD AND CONTROL DEVICE, AND POWER GENERATING PLANT UTILIZING SAME

CROSS-REFERENCE TO RELATED APPLICATIONS

This application is based upon and claims the benefit of priority from Japanese Patent Application No. 2013-148923, filed on Jul. 17, 2013, the entire contents of which are incorporated herein by reference.

FIELD

The present disclosure relate to a control method and a control device for a control valve utilized in industrial plants. In addition, the embodiments of the present disclosure also relate to a power generating plant utilizing the control method and the control device.

BACKGROUND

A turbine bypass valve and an attemperator spray valve are control valves utilized in industrial plants, and the controlling technology thereof is generally performed through a PID controller. The PID controller has a set value (SV value) and a process value (PV value) entered therein, and calculates a control instruction value (MV value) through a feedback control in such a way that the PV value becomes equal to the SV value.

Some control valves among the control valves utilized in industrial plants are designed to avoid a case in which the MV value becomes 100%, i.e., the control value is fully opened. Such control valves are utilized as turbine bypass control valves in a combined cycle power generating plant that is a combination of a gas turbine, a steam turbine, and an exhaust heat recovery boiler.

The turbine bypass control valve is provided with a PID controller controlling the same, and an SV value and a PV value are entered in this PID controller. The PID controller calculates an MV value so as to make the PV value consistent with the SV value. The MV value is an open level instruction for the turbine bypass control valve, and this valve is opened in accordance with this instruction. According to such PID controllers, when the SV value is set high, the MV value decreases, and when the SV value is set low, the MV value increases.

RELATED TECHNICAL DOCUMENTS

Patent Documents

[Patent Document 1] JP-A-2011-138326
[Patent Document 2] JP-A-2013-076388

When the SV value of the turbine bypass control valve is set to be a high value, the pressure in a drum increases, and thus the generated steam amount decreases. Hence, it is suitable that the SV value is set to be as small as possible in view of the performance. However, the way of operation of the combined cycle power generating plant varies, and when the heat absorption from a evaporator and a superheater is far beyond the assumption, the SV value set when a schedule is planned is too low, and thus the turbine bypass control valve is fully opened.

For example, the output and exhaust gas temperature of the gas turbine before the steam turbine is activated are controlled in accordance with the temperature of the rotor component of the steam turbine (typically, a first-stage internal metal temperature, hereinafter, referred to as an ST metal temperature). When, for example, the ST metal temperature is high, the output and exhaust gas temperature of the gas turbine are set to be high. Conversely, when the ST metal temperature is low, the output and exhaust gas temperature of the gas turbine are set to be low. Depending on the output by the gas turbine, the heat recovery of the evaporator and the superheater largely vary, and thus the amount of generated steam fluctuates.

Conversely, at the basic planning stage of a plant, a typical operation condition is assumed, and the internal pressure of the drum to be maintained is obtained based on the heat recovery balance in the typical operation condition. Accordingly, the SV value of the turbine bypass control valve is set to be, for example, 0.7 Mpa.

However, the value 0.7 Mpa is not obtained in consideration of all "various operation ways" of the combined cycle power generating plant. Hence, for example, the steam is generated beyond the assumption in an actual plant test operation, and thus the turbine bypass control valve is forcibly fully opened. When the turbine bypass control valve is fully opened, this state is completely losing the pressure control on the drum, resulting in an adverse effect to a safe operation such that the water level in the drum extremely changes.

In order to address this technical problem, the SV value can be set to be as high as possible so as to cause the turbine bypass control valve not to be fully opened in the case of "various operation ways" (e.g., 0.7 Mpa is increased to 1.0 Mpa or 1.5 Mpa). When, however, a high SV value is selected, the steam pressure increases, making the heat recovery of the evaporator poor, and decreasing the flow volume of the steam. Therefore, for example, the output by the steam turbine is reduced.

SUMMARY

Embodiments of the present disclosure have been made to address the aforementioned conventional technical problems, and it is an objective of the present disclosure to provide a control method and a control device for a control valve which can avoid a fully opened condition of the control valve by decreasing an MV value together with an increase in an SV value when the control value becomes substantially fully opened. Another objective of the present disclosure is to provide a power generating plant employing such control-valve control method and control device.

A power generating plant according to an aspect of the present disclosure includes: a gas turbine; an exhaust heat recovery boiler generating steam while utilizing exhaust gas from the gas turbine; a steam turbine rotated and driven by the steam from the exhaust heat recovery boiler; a condenser condensing the exhausted steam from the steam turbine, and supplying the condensed water to the exhaust heat recovery boiler; a turbine bypass system flowing steam from the exhaust heat recovery boiler to the condenser through a bypass control valve; a pressure sensor detecting a pressure inside a drum generating steam to be supplied to the turbine bypass system; and a controller outputting, based on a set value received from an input device and a process value from the pressure sensor, an open level instruction value to the control valve so as to make the process value consistent with the set value in accordance with a predetermined sampling cycle, in which: when the set value becomes high, the controller decreases the open level instruction value to the control valve; and the power generating plant further comprises a corrector correcting the control valve in a direction in which the open level instruction value decreases when the open level instruction value from the controller becomes larger than a predetermined value.

DETAILED DESCRIPTION

1. First Embodiment

[1-1. Configuration of Whole Power Generating Plant]

Figure 1:
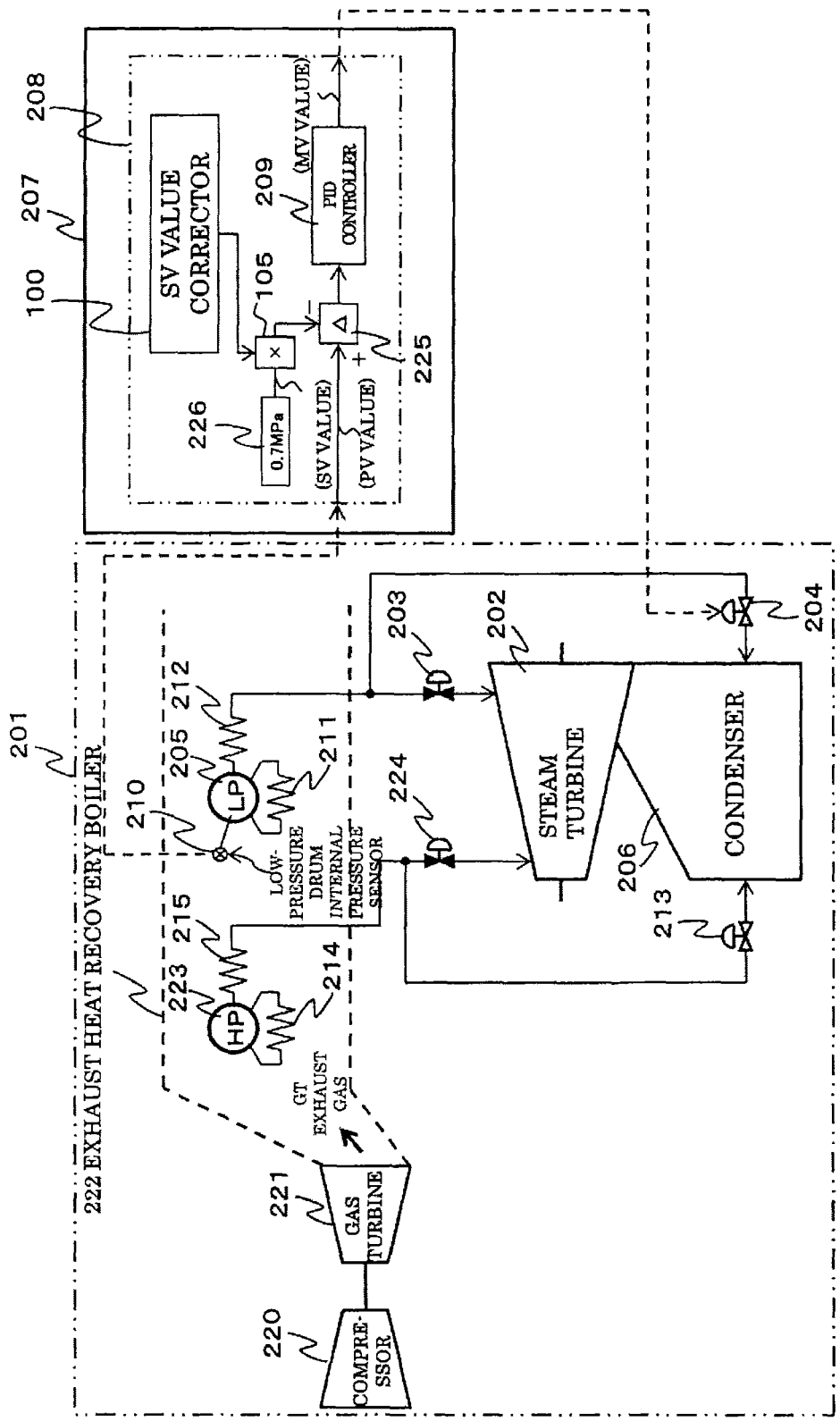
FIG. 1 is a circuit diagram illustrating a combined cycle power generating plant according to a first embodiment.

FIG. 1 illustrates an example configuration of a combined cycle power generating plant 201 in the first embodiment. This power generating plant 201 is a combination of a gas turbine plant including a gas turbine 221 and a compressor 220 with a steam turbine plant including a steam turbine 202 and a condenser 206, and, a heat recovery boiler 222. The heat recovery boiler 222 generates steam utilizing exhaust heat (exhaust gas) from the gas turbine 221, and this steam is supplied to the steam turbine 202 to generate electric power.

The heat recovery boiler 222 includes, along the flow direction of the exhaust gas, a high-pressure evaporator 214 including a high-pressure drum 223, a high-pressure superheater 215, a low-pressure evaporator 211 including a low-pressure drum 205, and a low-pressure superheater 212, in this order.

Heated steam from the high-pressure superheater 215 is supplied to the initial-flow stage of the steam turbine 202 through a high-pressure regulating valve 224, and the low-pressure steam from the low-pressure drum 205 is supplied to the follower-flow stage of the steam turbine 202 through a low-pressure regulating valve 203, respectively. The low-pressure steam pressure produced by the low-pressure drum 205 is detected by a pressure sensor 210 provided in the low-pressure drum 205.

The power generating plant 201 is provided with a turbine bypass system that directly flows steam generated from the heat recovery boiler 222 to the condenser 206 of the steam turbine plant at the time of activation operation or system-failure operation. This turbine bypass system includes a high-pressure system that makes steam flow from the high-pressure superheater 215 to the condenser 206 through a high-pressure turbine bypass control valve 213, and a low-pressure system that makes steam flow from the low-pressure superheater 212 to the condenser 206 through a low-pressure turbine bypass control valve 204.

In the low-pressure system, before the steam turbine 202 is activated and the low-pressure regulating valve 203 is opened, the low-pressure turbine bypass control valve 204 is opened to guide low-pressure steam generated by the low-pressure drum 205 to the condenser 206. The open level of the low-pressure turbine bypass control valve 204 is controlled by a DCS (Distributed Control System) 207 of the power generating plant 201. The DCS 207 controls the open level of the low-pressure turbine bypass control valve 204 so as to relieve an appropriate amount of low-pressure steam to the condenser 206 while maintaining the internal pressure of the low-pressure drum 205 to be an appropriate value.

[1-2. Configuration of Control Valve Control Device]

Figure 2:
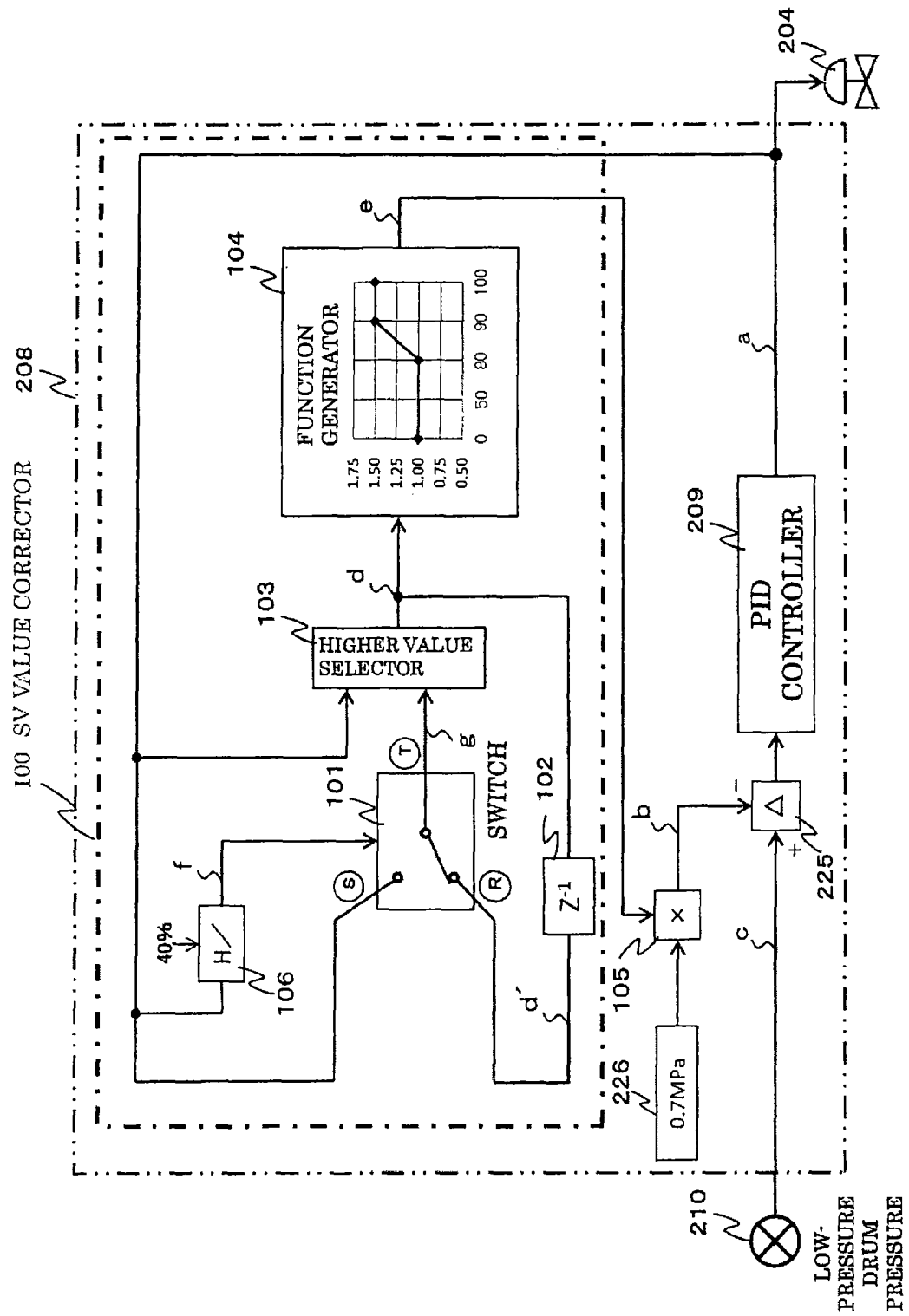
FIG. 2 is a circuit diagram illustrating a controller for a pressure turbine bypass control valve according to the first embodiment.

Only a controller 208 for the low-pressure turbine bypass control valve 204 in the whole control circuit of the whole DCS 207 for the power generating plant is illustrated in FIGS. 1 and 2.

The DCS 207 of this embodiment employs a digital calculation scheme of performing calculation at a predetermined sampling cycle, and controls the respective function blocks of the combined cycle power generating plant 201. In this embodiment, the DCS 207 performs calculation at a sampling cycle of, for example, 250 ms.

A PID controller 209 that controls the low-pressure turbine bypass control valve 204 is provided in the controller 208 of the DCS 207. An SV value b and a PV value c are entered in this PID controller 209. The SV value b is an internal pressure of the low-pressure drum 205 to be maintained, is entered from an SV-value setter 226, and is 0.7 Mpa in this embodiment. The PV value c is an actual internal pressure of the low-pressure drum 205, and is measured by the pressure sensor 210 provided in the low-pressure drum 205.

When those SV value b and PV value c are entered, the PID controller 209 calculates a control instruction (hereinafter, referred to as an MV value a) making the PV value c consistent with the SV value b. The MV value a is an open level instruction to the low-pressure turbine bypass control valve 204, and this valve is opened in accordance with this instruction. In this embodiment, when the SV value b (internal pressure to be maintained) is set high, the flow amount of the low-pressure steam to be relieved to the condenser 206 can be reduced, and thus the MV value a (open level instruction to the control valve) becomes small. Conversely, when the SV value b is low, the MV value a increases.

The controller 208 is provided with a corrector 100 that corrects the SV value entered in the PID controller 209. The corrector 100 corrects the entered SV value, and outputs the SV value b. This corrector 100 includes a switch 101, a sampling delay device 102 indicated by a symbol of Z−1, a higher-value selector 103, and a function generator 104.

The switch 101 is provided with two input terminals S, R, and an output terminal T. The MV value a output by the PID controller 209 is entered to the input terminal S. A MAX_MV value d' of one cycle before (250 ms before) is entered to the input terminal R from the sampling delay device 102. An output g from the output terminal T is entered in either one input terminal of the higher-value selector 103.

A switch control signal is entered to the switch 101. This switch control signal is output by a comparator 106 connected to a control terminal (unillustrated) of the switch 101. The MV value a from the PID controller 209 is entered to the comparator 106. The comparator 106 outputs an output f=1 when, for example, the MV value a is equal to or higher than 40%, and outputs the output f=0 when the MV value a becomes smaller than 40%.

The sampling delay device 102 has the current MAX_MV value d entered thereto and output by the higher-value selector 103, and outputs the MAX_MV value d' of one cycle before (250 ms before). The higher-value selector 103 has the current MV value a and the output g by the switch 101 entered thereto, and outputs the larger value between both values as the MAX_MV value d.

The function generator 104 has the MAX_MV value d entered thereto and outputs a gain e, and a conversion from the MAX_MV value d to the gain e is performed based on a function having four break points that are (0%, 1.0), (80%, 1.0), (90%, 1.5) and (100%, 1.5) (X axis, Y axis). In accordance with this function, when the MAX_MV value d is larger than 80%, the function generator 104 increases the gain e to be a value equal to or larger than 1.0, thereby increasing the SV value.

The output side of the corrector 100 is connected to a multiplier 105 provided at the input side of the PID controller 209. The gain e that is an output by the function generator 104 of the corrector 100 and a preset SV value (0.7 Mpa) are entered to the multiplier 105. The multiplier 105 multiplies both values to output the SV value b.

[1-3. Operation and Advantageous Effects]

Next, an explanation will be below given of the operation and advantageous effects of this embodiment for three example cases.

In this embodiment, it is presumed that the DCS 207 performs calculation at a sampling cycle of 250 ms. Hence, in the following explanation, as respective times t of the sampling cycle, the explanation will be given in accordance with a discrete time advancement for each 250 ms, such as t=0, t=250 ms, and t=500 ms.

The behavior and response characteristic of the actual low-pressure turbine bypass control valve 204 are slower than the following explanation, and the numeric value does not largely change within a short time like 250 ms in the following explanation, but in order to clarify the advantageous effects of the controller 208, such a value is adopted.

[1-3-1 First Case]

In a first case, the MV value a decreases immediately at the next sampling cycle because the SV value b increases to 0.875 Mpa from 0.7 Mpa. How the open level instruction for the low-pressure turbine bypass control valve 204 changes will be explained for each sampling cycle.

(1) t=0

(a) The SV value b that is 0.7 Mpa is entered to the PID controller 209. Based on this SV value b and the PV value c, the PID controller 209 outputs the MV value a that is 79%.

(b) This MV value a that is 79% is entered to the comparator 106. Since the threshold value of the comparator 106 is the MV value a that is equal to or higher than 40%, the comparator 106 outputs the output f=1 to the switch 101. The switch 101 is switched to the input-terminal-R side based on this output f=1.

(c) At a time point at which t=0, the output d' by the sampling delay device 102 is 0% although the switch 101 is switched to the input-terminal-R side, the higher-value selector 103 outputs the MV value a=79% from the PID controller 209 as MAX_MV value d=79%.

(d) In the function generator 104, the Y axis relative to X axis=79% is 1.00, and thus the function generator 104 outputs the gain e that is 1.00. The multiplier 105 multiplies the SV value b=0.7 Mpa by the gain e=1.00, thereby calculating the SV value b=0.7 Mpa. Hence, the input and output of the PID controller 209 becomes the same value as (a), and the low-pressure turbine bypass control valve 204 is controlled based on the output MV value a that is 79%.

(2) t=250 ms (a) A large amount of low-pressure steam is generated and the PV value c increases. Accordingly, the MV value a output by the PID controller 209 increases to 85%.

(b) This MV value a that is 85% is entered to the comparator 106. Since the threshold value of the comparator 106 is the MV value a that is equal to or higher than 40%, the comparator 106 outputs f=1, and the switch 101 maintains the position at the input-terminal-R side.

(c) Entered to the higher-value selector 103 are MAX_MV value d'=79% output by the sampling delay device 102 when t=0 that is one cycle before, and the MV value a=85% output by the PID controller 209 when t=250 ms. The higher-value selector 103 selects a higher value that is 85%, and outputs MAX_MV value d that is 85%.

(d) In the function generator 104, the Y axis relative to X axis=85% is 1.25, and thus the function generator 104 outputs the gain e that is 1.25.

(e) The multiplier 105 multiplies 0.7 Mpa by 1.25 to obtain 0.875 Mpa=SV value b of 0.7 Mpa×1.25. Hence, based on the corrected SV value b that is 0.875 Mpa and the PV value c, the PID controller 209 calculates the MV value a that is 78%. Therefore, the open level of the low-pressure turbine bypass control valve 204 is controlled based on the MV value a that is 78%.

(3) t=500 ms (a) Since the SV value b has increased to 0.875 Mpa, the MV value a decreases to 78%.

(b) Entered to the higher-value selector 103 are MAX_MV value d'=85% output by the sampling delay device 102 when t=250 ms and, and the MV value a=78% when t=500 ms. The higher-value selector 103 selects a higher value that is 85%.

(c) As a result, like the case in which t=250 ms in (2), the value of the MAX_MV value d that is 85% is maintained, and the SV value b is also maintained at 0.875 Mpa. Hence, based on the corrected SV value b=0.875 Mpa and the PV value c, the PID controller 209 calculates the MV value a that is 78%. The open level of the low-pressure turbine bypass control valve 204 is controlled based on the MV value a=78%.

The following is a list of the values for each sampling cycle at respective blocks in the corrector 100.

TABLE 1

| | T (in seconds) | MV value a (%) | Switch contact | Switch output g(%) | Higher-value selector output d(%) | Gain e | MV value a after correction(%) |
|---|---|---|---|---|---|---|---|
| (1) | 0 | 79 | R | 0 | 79 | 1.0 | 79 |
| (2) | 250 | 85 | R | 79 | 85 | 1.25 | 78 |
| (3) | 500 | 78 | R | 85 | 85 | 1.25 | 78 |

In this embodiment, the reason why the MV value is set to 79% is because it is a proximate value to the threshold that is 80% at which the gain changes, making the understanding of the operation of the present invention easier.

(4) Advantageous Effects of First Case

According to this embodiment, in the first case, when the MV value a is equal to or smaller than 80%, the SV value b is maintained to an initial setting value that is 0.7 Mpa.

Conversely, when the MV value increases beyond 80% (85% in the aforementioned case), the corrector 100 increases the SV value b to decrease the MV value a (78% in the aforementioned case), thereby preventing the low-pressure turbine bypass control valve 204 from being fully opened.

In particular, when the MV value a simply increases beyond 80% without the higher-value selector 103 and the sampling delay device 102 being provided, according to a method of increasing the SV value using the function generator 104, when the MV value decreases to 78% in accordance with the increase in the SV value, the SV value is returned to the original value that is 0.7 Mpa, and the SV value and the MV value relatively repeat increasing and decreasing, and thus the convergence is delayed or no convergence is carried out at all. In contrast, according to this embodiment, the higher-value selector 103 and the sampling delay device 102 are provided to select the MAX_MV value d that is the maximum MV value a from the past to the current time and to correct the SV value, thereby eliminating the above described technical problems.

[1-3-2 Second Case]

In the second case, the same behavior as that of the first case is obtained until t=250 ms, but at the next t=500 ms, the MV value a further increases, and at the next t=750 ms, the MV value a decreases.

(1) t=0
Same as first case.
(2) t=250 ms
Same as first case.
(3) t=500 ms (a) When the PV value further increases although the SV value b has increased to 0.875 Mpa, the MV value a increases to 88%.

(b) Entered to the higher-value selector 103 are the MAX_MV value d'=85% output by the sampling delay device 102 when t=250 ms that is one cycle before, and the MV value a=88% output by the PID controller 209 when t=500 ms. The higher-value selector 103 selects the higher value that is 88%, and outputs the MAX_MV value d=88%.

(c) In the function generator 104, the Y axis relative to the X axis=88% is 1.3, and thus the function generator 104 outputs the gain e that is 1.3.

(d) The multiplier 105 multiplies 0.7 Mpa by 1.3, and calculates the SV value b=0.7 Mpa×1.3=0.91 Mpa. The PID controller 209 calculates the MV value a=84% based on the corrected SV value=0.91 Mpa and the PV value c. The open level of the low-pressure turbine bypass control valve 204 is controlled based on the MV value a that is 84%.

(4) t=750 ms (a) Since the SV value b has increased to 0.91 Mpa, the MV value a decreases to 84%.

(b) Entered to the higher-value selector 103 are the MAX_MV value d'=88% output by the sampling delay device 102 when t=500 ms that is one cycle before, and the MV value a=84% output by the PID controller 209 when t=750 ms. The higher-value selector 103 selects the higher value that is 88%, and the value that MAX_MV value d=88% is maintained. As a result, the SV value b is maintained to 0.91 Mpa, and like the case of (3) when t=500 ms, the MV value a is maintained to 84%.

The following is a list of values for each sampling cycle at respective blocks of the corrector 100.

TABLE 2

| | T (in seconds) | MV value a (%) | Switch contact | Switch output g(%) | Higher-value selector output d(%) | Gain e | MV value a after correction(%) |
|---|---|---|---|---|---|---|---|
| (1) | 0 | 79 | R | 0 | 79 | 1.0 | 79 |
| (2) | 250 | 85 | R | 79 | 85 | 1.25 | 78 |
| (3) | 500 | 88 | R | 88 | 88 | 1.3 | 84 |
| (4) | 750 | 84 | R | 88 | 88 | 1.3 | 84 |

(5) Advantageous Effects of Second Case

According to this embodiment, in the second case, when the MV value a increases to 88% from 85%, the SV value b is further increased to 0.91 Mpa in accordance with the increase in the MV value. Conversely, when the increase in the MAX_MV value d reaches a peak (in the aforementioned case, when MV value a decreases to 84% at t=750 ms), the SV value b is maintained as it is (in the aforementioned case, 0.91 Mpa).

As explained above, according to this embodiment, an unnecessary increase in the SV value b is avoided, but the smallest SV value b to avoid the fully opening of the low-pressure turbine bypass control valve 204 (in the aforementioned case, 0.91 Mpa) is calculated.

[1-3-3 Third Case]

A third case is a sequence successively occurring after the time t=750 ms of the second case, and represents a behavior from t=1000 ms.

(1) t=1000 ms (a) The low-pressure regulating valve 203 starts opening.

(b) Hence, the MV value a starts decreasing. It is presumed that the MV value decreases to, for example, 75%.

(c) Entered to the higher-value selector 103 are the MAX_MV value d'=88% output by the sampling delay device 102 when t=750 ms that is one cycle before, and the MV value a=75% when t=1000 ms. The higher-value selector 103 selects the higher value that is 88%, and outputs the MAX_MV value d=88%.

(d) Hence, the SV value b=0.91 Mpa is maintained. Like the case when t=750 ms, the MV value a is maintained to 84%.

(2) t=1250 ms (a) Since the open level of the low-pressure regulating valve 203 has further increased, the MV value a decreases to 39%.

(b) Since the MV value a entered to the comparator 106 becomes equal to or less than 40%, the comparator 106 outputs f=0.

(c) The switch 101 switches the circuit to the S-T terminal in accordance with the output f=0 by the comparator 106. As a result, the switch 101 outputs the MV value a=39% as an output g.

(e) Entered to the higher-value selector 103 are the output g (39%) by the switch 101, and the MV value a (39%) by the PID controller 209. Since those two values are equal, the higher-value selector 103 outputs the MAX_MV value d=39%.

(f) In the function generator 104, since the Y axis relative to the X axis that is 39% is 1.0, the function generator 104 outputs the gain e that is 1.0. The multiplier 105 multiplies 0.7 Mpa by the gain e=1.0, thereby calculating the SV value b=0.7 Mpa. As a result, based on the SV value b that is consistent with the initial value, and the PV value c, the PID controller 209 calculates the MV value a. The low-pressure turbine bypass control valve 204 is controlled based on this MV value a.

The following is a list of values for each sampling cycle at respective blocks of the corrector 100.

TABLE 3

| | T (in seconds) | MV value a (%) | Switch contact | Switch output g(%) | Higher-value selector output d(%) | Gain e | MV value a after correction(%) |
|---|---|---|---|---|---|---|---|
| (1) | 1000 | 75 | R | 88 | 88 | 1.3 | 84 |
| (2) | 1250 | 39 | S | 39 | 39 | 1.0 | 39 |

(3) Advantageous Effects of Third Case

According to this embodiment, in the third case, when the MV value a becomes smaller than 40%, and the possibility that the low-pressure turbine bypass control valve 204 is fully opened is reduced, the SV value is returned to the original small value that is 0.7 Mpa.

[1-3-4 Advantageous Effects of Embodiment]

As is indicated in each example case, in this embodiment, the sampling delay device 102 is provided. The MAX_MV value that is the highest MV value is selected among the MV values from the past to the current time is selected, and when the MAX_MV value becomes large beyond the predetermined value, the SV value is increased. Accordingly, when the low-pressure turbine bypass control valve 204 becomes substantially fully opened, the MV value is decreased together with the increase in the SV value, thereby avoiding the fully opened condition of the low-pressure bypass turbine control valve.

2. Second Embodiment

An explanation will be given of a combined cycle power generating plant 201 of a second embodiment. This embodiment modifies the structure of the power generating plant 201 and the control method by the DCS 207 of the first embodiment. The same structural element will be denoted by the same reference numeral, and the duplicated explanation thereof will be omitted.

[2-1. Configuration of Whole Power Generating Plant]

Figure 3:
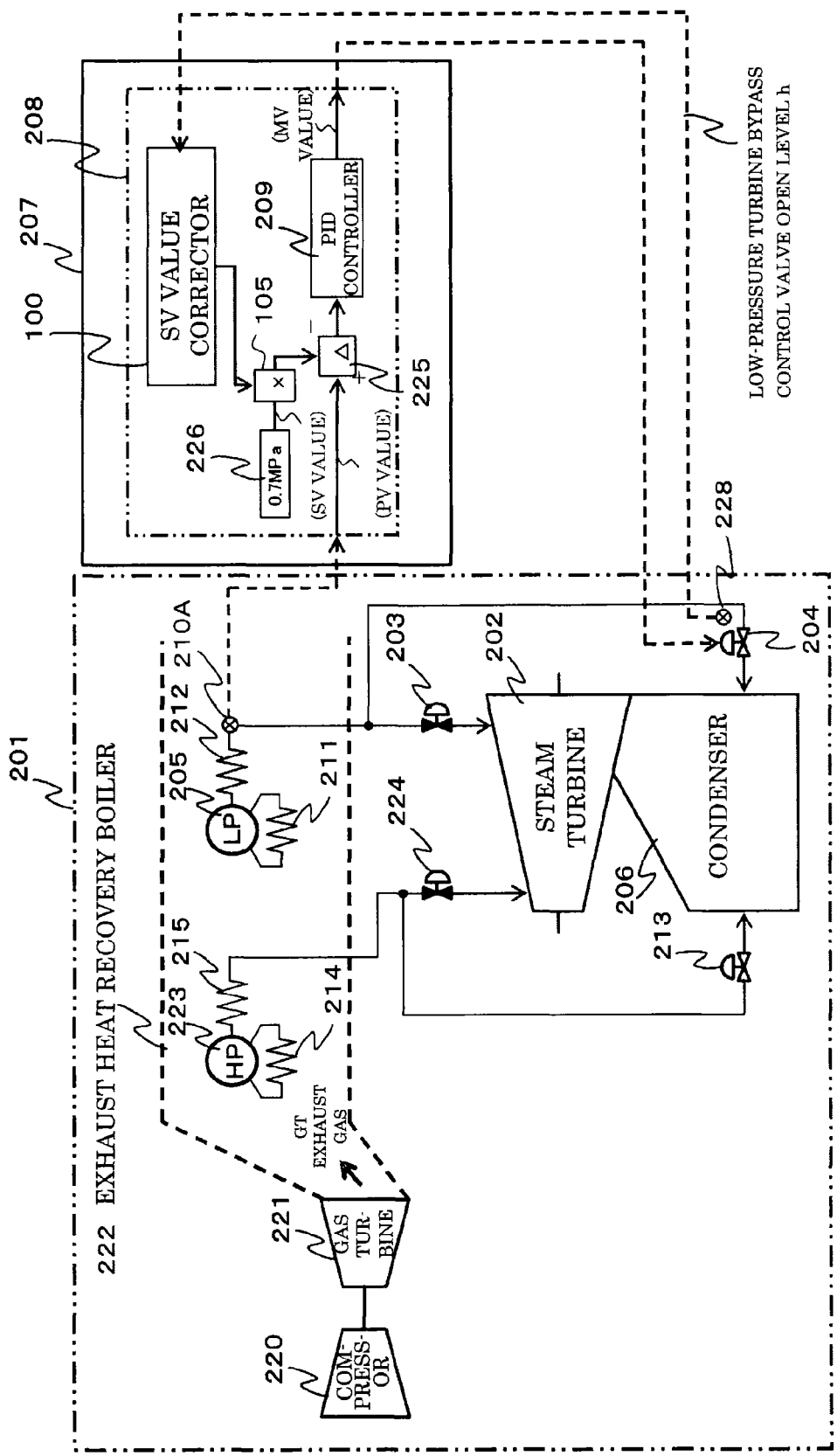
FIG. 3 is a circuit diagram illustrating a combined cycle power generating plant according to a second embodiment.

FIG. 3 illustrates an example configuration of the combined cycle power generating plant 201 of the second embodiment. According to this combined cycle power generating plant 201, the low-pressure turbine bypass control valve 204 is provided with a valve open-level detector 228 that detects the open level of the control valve. This valve open-level detector 228 detects a valve open level h changing in accordance with the open/close operation of the low-pressure turbine bypass control valve 204. The valve open level h detected by the valve open-level detector 228 is transmitted to the switch 101 of the DCS 207, the higher-value selector 103, and the comparator 106.

In addition, according to this embodiment, instead of the pressure sensor 210 placed in the low-pressure drum 205 of the foregoing embodiment, the low-pressure superheater 212 is provided with a steam pressure sensor 210A that detects the pressure of steam produced from the low-pressure drum 205. The steam pressure detected by the steam pressure sensor 210A is transmitted to the PID controller 209 of the DCS 207.

[2-2. Configuration of Control Valve Control Device]

Figure 4:
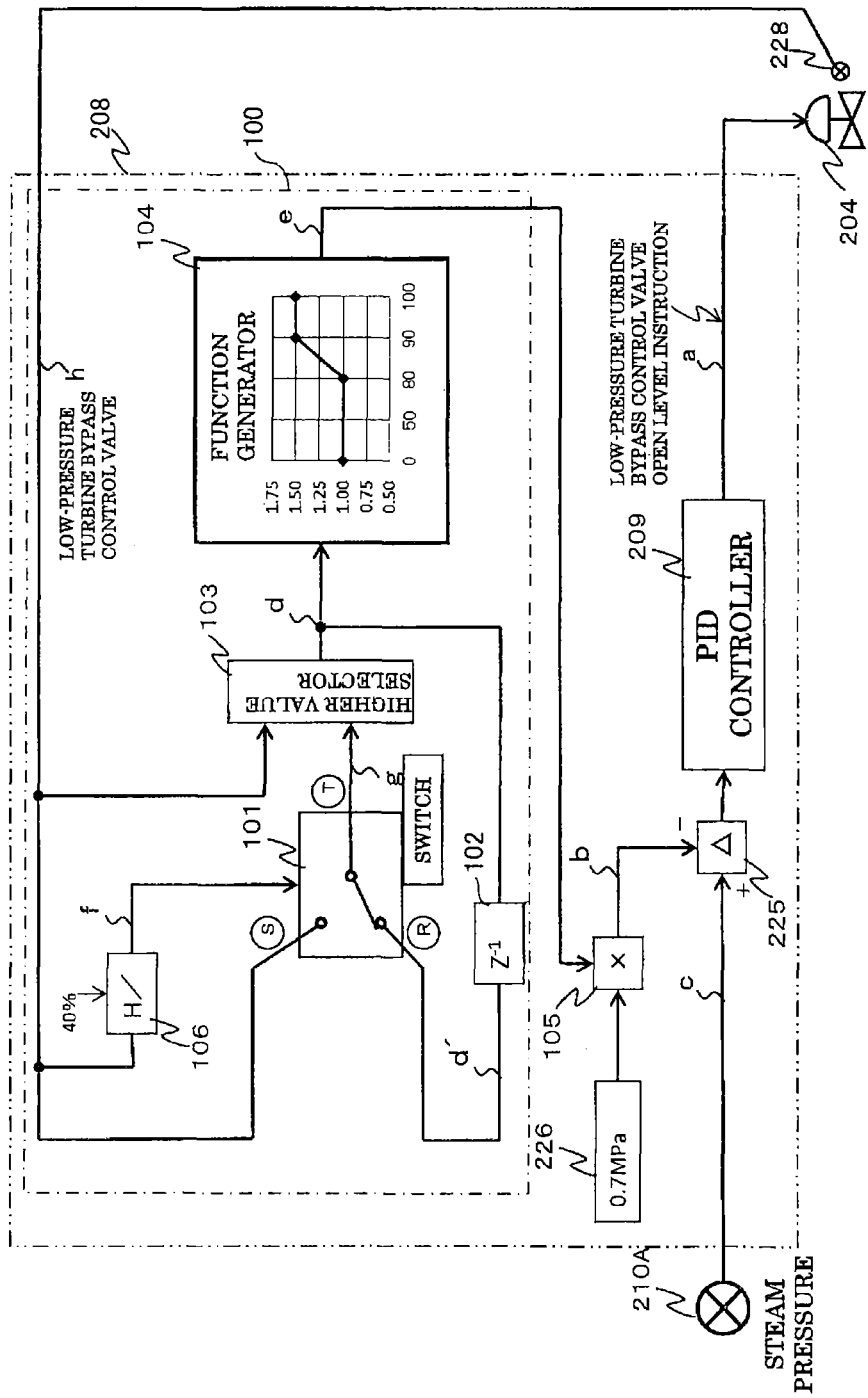
FIG. 4 is a circuit diagram illustrating a controller for a pressure turbine bypass control valve according to the second embodiment.

FIG. 4 illustrates only the controller 208 of the low-pressure turbine bypass control valve 204 in the control circuit for the whole power generating plant of the whole DCS 207.

Input into the PID controller 209 provided in the DCS 207 are an SV value b and a PV value c. The SV value b of this embodiment is steam pressure produced from the low-pressure drum 205, and is a target pressure to be maintained. This SV value b is input from the SV-value setter 226, and is 0.7 Mpa in this embodiment. The PV value c is actual steam pressure produced from the low-pressure drum 205, and is measured by the steam pressure sensor 210A. The PID controller 209 calculates an MV value a based on the SV value b and the PV value c.

In addition, input to the input terminal S of the switch 101 is the valve open level h of the low-pressure turbine bypass control valve 204 output by the valve open-level detector 228. Input to the switch 101 are the valve open level h input through the input terminal S, and a MAX_MV value d' of one cycle before (250 ms before) from the sampling delay device 102. The switch 101 changes the input signal and output it.

The valve open level h of the low-pressure turbine bypass control valve 204 is also input to the comparator 106 that outputs the switch control signal to the switch 101. The comparator 106 outputs the control signal to switch the input terminal selected by the switch 101 in accordance with the valve open level h. When, for example, the valve open level h is equal to or higher than 40%, the comparator outputs f=1 to cause the switch 101 to select the input terminal R, and when the valve open level becomes lower than 40%, the comparator outputs f=0 to cause the switch to select the input terminal S.

[2-3. Operation]

According to the combined cycle power generating plant 201 of the second embodiment, the detector 228 is provided which detects the valve open level h of the low-pressure turbine bypass control valve 204, and the control instruction MV value a is calculated with the valve open level h of the low-pressure turbine bypass control valve 204 being as a factor.

That is, according to the first embodiment, the SV value b is corrected based on the MV value a calculated in advance, and the new MV value a is calculated based on that SV value b. Conversely, according to this embodiment, in view of the fact that the MV value a and the valve open level h are consistent when the low-pressure turbine bypass control valve 204 operates normally, the valve open level h is used to correct the SV value b upon calculating the MV value a.

The low-pressure turbine bypass control valve 204 performs valve opening operation in accordance with the input MV value a that is the open/close level instruction value. When the MV value a and the actual valve open level h differ from each other, the low-pressure turbine bypass control valve 204 operates in accordance with the MV value a. Hence, the valve open level h tracks the MV value a with a time delay in a several second order necessary for the low-pressure turbine bypass control valve 204 to operate. The deviation between the MV value a and the actual valve open level h becomes small as the valve open level tracks the MV value a, and thus the time delay of the valve open level h to the MV value a becomes small. Eventually, the MV value a and the valve open level h become consistent. Therefore, according to this embodiment that utilizes the valve open level h instead of the MV value a, by causing the MV value a and the valve open level h to be consistent with each other, like the first to third cases of the foregoing embodiment, the SV value b is corrected as needed, and the low-pressure turbine bypass control valve 204 is controlled based on this SV value b.

[2-4. Advantageous Effects]

According to this embodiment, the sampling delay device 102 is provided. According to this configuration, the highest valve open level h within a time period from the current time to the past is selected, and when the valve open level h becomes large beyond a predetermined value, the SV value is increased. Hence, when the low-pressure turbine bypass control valve 204 becomes close to a fully opened condition, the MV value a is reduced together with the increase in the SV value, thereby preventing the bypass control valve from being fully opened.

According to the combined cycle power generating plant 201, from the standpoint of economic efficiency, a pneumatic valve that is opened or closed by air pressure is applied. Some pneumatic valves have no valve open-level detector that detects the valve open level from the standpoint of economic efficiency. According to the combined cycle power generating plant 201 needing a high reliability, however, the valve open-level detector 228 is provided. This embodiment is applicable to the combined cycle power generating plant 201 including an actuated valve provided with a detector that detects the valve open level thereof in view of the reliability, and the reliability of such a power generating plant is improved.

In addition, according to this embodiment, means for monitoring the deviation between the valve open level h and the MV value a may be further provided. According to this structure, when the drive mechanism of the low-pressure turbine bypass control valve 204 breaks down or when an air source is in an empty condition, the open/close operation of the low-pressure turbine bypass control valve 204 becomes unable to track the MV value a. When the deviation between the valve open level h and the MV value a is monitored, and when it is determined whether or not the deviation becomes larger than the allowable value, it becomes possible to detect an occurrence of abnormality in the low-pressure turbine bypass control valve 204.

In addition, according to this embodiment, instead of the low-pressure drum internal pressure sensor 210, the steam pressure sensor 210A that detects steam pressure at the outlet of the low-pressure superheater 212 is provided. As to the pressure inside the low-pressure drum to be detected by the low-pressure drum sensor 210 and the steam pressure to be detected by the steam pressure sensor 210A, the steam pressure detected by the steam pressure sensor 210A becomes low by what corresponds to the pressure loss when passing through the superheater 212. However, such a difference is in an ignorable level, and both can be deemed as substantially same. Hence, according to this embodiment having the steam pressure sensor 210A that detects the steam pressure at the outlet of the low-pressure superheater 212 instead of the low-pressure drum sensor 210, the same advantageous effects as those of the foregoing embodiment can be accomplished.

3. Other Embodiments (1) While certain embodiments have been described, these embodiments have been presented byway of example only, and are note intended to limit the scope of the inventions. Indeed, the novel embodiments described herein may be embodied in a variety of other forms; furthermore, various omission, substitutions and changes in the form of the embodiment described herein may made without departing from the spirit of the inventions. The accompanying claims and their equivalents are intended to cover such forms or modifications a would fall within the scope and spirit of the inventions.

(2) For example, in the first embodiment, the combined cycle power generating plant 201 has two drums that are high-pressure and low-pressure drums, and the low-pressure turbine bypass control valve 204 is controlled based on the low-pressure steam pressure produced by the low-pressure drum 205. However, the first embodiment is not limited to this configuration. For example, the high-pressure turbine bypass valve may be controlled based on high-pressure steam pressure produced by the high-pressure drum. In addition, the control of the low-pressure turbine bypass control valve 204 based on the low-pressure steam pressure, and the control of the high-pressure turbine bypass valve based on the high-pressure steam pressure may be performed simultaneously in the same combined cycle power generating plant 201. Likewise, in the second embodiment, the steam pressure sensor 210A may be disposed at the steam outlet of the high-pressure drum, and may be disposed at both steam outlets of the low-pressure drum and the high-pressure drum.

For example, in FIG. 1, the high-pressure turbine bypass control valve 213 is also affected by the heat absorption of the high-pressure evaporator 214 and the high-pressure superheater 215, and the amount of generated high-pressure steam also changes. However, in view of the high-pressure evaporator 214 and the high-pressure superheater 215 being disposed along the flow of the exhaust gas from the gas turbine, those are disposed at the upstream side of the low-pressure evaporator 211 and that of the low-pressure superheater 212. Accordingly, the amount of generated high-pressure steam can be checked relatively easily, and, for example, there is already a conventional technology that sets the SV value to be a variable value in accordance with an ST metal temperature and a gas turbine output.

Hence, the technical problem associated with the fully open condition of the high-pressure turbine bypass control valve 213 is relatively addressed, but there is no discourage to apply the embodiment of the present disclosure to the high-pressure turbine bypass control valve 213, and such an application is recommended to ensure the avoidance of the full-open risk.

(3) As a gain determiner according to each embodiment, instead of the function generator 104, a table associating the MAX_MV value d with the gain e may be prepared, and the gain selected from this table may be output to the multiplier 105. In addition, instead of the function generator 104 and the multiplier 105, a table associating the MAX_MV value d with the corrected SV value b may be prepared, and a predetermined corrected SV value b may be selected from this table.

(4) Instead of the PID controller 209 in each embodiment, the other kind of controller having the same function (having the SV value and the PV value entered therein, and outputting an MV value) may be applied.

(5) Each embodiment is widely applicable to, in addition to the bypass control valve for a combined cycle power generating plant, general control valves utilized in various locations in other plants.

(6) In each embodiment, the DCS 207 performs calculation at a sampling cycle of 250 ms, but the calculation may be performed at other sampling cycles. In addition, the sampling delay device 102 outputs the MAX_MV value d' one cycle before, but such an output is not limited to the MAX_MV value d' one cycle before. That is, a MAX_MV value d' two cycles before, or three cycles before may be output.

(7) In each embodiment, the SV value and the PV value are entered to the PID controller 209 to calculate the MV value, but a subtractor 225 may be provided at the preceding stage of the PID controller 209. The PID controller 209 can calculate the PV value based on a difference.

(8) In each embodiment, in (2) t=1250 ms in the third case, the switch 101 is switched to the S-T terminal in accordance with the output f=0 by the comparator 106. In this case, the circuit at the sampling-delay-device-102 side is disconnected, and thus no MAX_MV value d output by the higher-value selector 103 is entered to the sampling delay device 102. When this state continues for a certain time period, the MAX_MV value d by the sampling delay device 102 can be set to 0. Accordingly, when the open level instruction by the PID controller 209 becomes equal to or smaller than a value that makes the output f=0 by the comparator 106, the SV value can be returned to the initial set value.

What is claimed is:

1. A power generating plant comprising:
    a gas turbine;
    an exhaust heat recovery boiler configured to generate steam by using exhaust gas from the gas turbine;
    a steam turbine rotated and driven by the steam from the exhaust heat recovery boiler;
    a condenser configured to condense an exhausted steam from the steam turbine into water, and supplying condensed water to the exhaust heat recovery boiler;
    a turbine bypass system configured to make the steam flow from the exhaust heat recovery boiler to the condenser through a control valve;
    a pressure sensor configured to detect a pressure inside a drum generating the steam to be supplied to the turbine bypass system; and
    a controller configured to output, based on a set value received from an input device and a process value from the pressure sensor, an open level instruction value to the control valve so as to make the process value consistent with the set value in accordance with a predetermined sampling cycle, and configured to decrease the open level instruction value to the control valve when the set value becomes high, and
    the controller comprising a corrector configured to correct the set value to decrease the open level instruction value when the open level instruction value from the controller becomes larger than a predetermined value.

2. The power generating plant according to claim 1, wherein the corrector comprises:
    a sampling delay device that has the open level instruction value entered therein at every sampling cycle, and outputting the open level instruction value of one cycle before;
    a switch that has the open level instruction value from the controller and the open level instruction value one cycle before from the sampling delay device entered therein, and outputting either one of the values;
    a higher-value selector that compares the open level instruction value from the controller with the open level instruction value output by the switch to output a higher value; and
    a multiplier that corrects the set value from the input device based on the open level instruction value output by the higher-value selector.

3. The power generating plant according to claim 2, wherein:
    the corrector comprises a gain determiner that determines a gain based on a maximum open level instruction value output by the higher-value selector; and
    the multiplier corrects the set value from the input device based on the gain output by the gain determiner.

4. The power generating plant according to claim 3, wherein the gain determiner comprises a function generator that outputs the gain to the entered maximum open level instruction value in accordance with a function of the gain relative to the maximum open level instruction value.

5. The power generating plant according to claim 4, wherein the corrector comprises a comparator that compares the open level instruction value from the controller with a preset threshold, changing the switch to the sampling-delay-device side when the open level instruction value from the controller is larger than the preset threshold, while changing the switch to the open-level-instruction-value side of the controller when the open level instruction value from the controller is smaller than the preset threshold.

6. The power generating plant according to claim 3, wherein the corrector comprises a comparator that compares the open level instruction value from the controller with a preset threshold, changing the switch to the sampling-delay-device side when the open level instruction value from the controller is larger than the preset threshold, while changing the switch to the open-level-instruction-value side of the controller when the open level instruction value from the controller is smaller than the preset threshold.

7. The power generating plant according to claim 2, wherein the corrector comprises a comparator that compares the open level instruction value from the controller with a preset threshold, changing the switch to the sampling-delay-device side when the open level instruction value from the controller is larger than the preset threshold, while changing the switch to the open-level-instruction-value side of the controller when the open level instruction value from the controller is smaller than the preset threshold.

8. A power generating plant comprising:
    a gas turbine;
    an exhaust heat recovery boiler configured to generate steam by using exhaust gas from the gas turbine;
    a steam turbine rotated and driven by the steam from the exhaust heat recovery boiler;
    a condenser configured to condense an exhausted steam from the steam turbine into water, and supplying condensed water to the exhaust heat recovery boiler;

a turbine bypass system configured to make the steam flow from the exhaust heat recovery boiler to the condenser through a bypass control valve;

a drum generating the steam to be supplied to the turbine bypass system;

a pressure sensor configured to detect pressure of the steam generated by the drum;

an open level detector configured to detect an open level of the bypass control valve; and a controller configured to output, based on a set value received from an input device and a process value from the pressure sensor, an open level instruction value to the control valve so as to make the process value consistent with the set value in accordance with a predetermined sampling cycle, and configured to decrease the open level instruction value to the control valve when the set value becomes high; and the controller comprising a corrector configured to correct the set value to decrease the open level instruction value when the open level detected by the open level detector becomes larger than a predetermined value.

\* \* \* \* \*